United States Patent [19]

Nichols

[11] Patent Number: 5,569,505

[45] Date of Patent: Oct. 29, 1996

[54] DECORATIVE PANEL CONSTRUCTION

[75] Inventor: Robert K. Nichols, Muscatine, Iowa

[73] Assignee: Hon Industries, Inc., Muscatine, Iowa

[21] Appl. No.: 488,929

[22] Filed: Jun. 9, 1995

[51] Int. Cl.$^6$ .................................................. B32R 3/12
[52] U.S. Cl. .......................... 428/57; 428/60; 428/73; 428/76; 428/116; 428/122; 428/157; 428/158; 428/167; 428/192; 52/782.22; 52/783.1; 52/793.1
[58] Field of Search ..................... 108/64; 52/782.2, 52/782.21, 782.22, 782.23, 783.1, 793.1; 428/57, 60, 72, 73, 76, 116, 122, 99, 156, 157, 158, 192, 167, 113

[56] References Cited

U.S. PATENT DOCUMENTS

| | | | |
|---|---|---|---|
| 1,575,842 | 3/1926 | Johnston | 428/60 |
| 2,032,878 | 3/1936 | Hunter | 52/782.22 |
| 4,310,995 | 1/1982 | Hanna | 52/793.1 |
| 4,680,902 | 7/1987 | Stefnik | 52/793.1 |
| 5,075,148 | 12/1991 | Burcky | 428/192 |
| 5,173,348 | 12/1992 | Gevaert | 52/782.2 |
| 5,424,108 | 6/1995 | Whetstone | 428/122 |

*Primary Examiner*—Ellis Robinson
*Assistant Examiner*—Timothy M. Speer
*Attorney, Agent, or Firm*—Jones, Day, Reavis & Pogue

[57] ABSTRACT

A panel or slab construction includes a fiber core glued between two facing sheets of thin metal and having edges of the core spaced inwardly of the slab from the associated edges of the metal facing sheets thereby defining a recess. A decorative molding member having a predetermined shaped edge extends into the recess and is fixed to the edges of the metal sheets thereby concealing the adjacent edges of the core. At least one side of the molding is stepped approximately the thickness of the metal sheet such that the sheet overlies the molding with its exposed surface forming a flush transition with the surface of the shaped molding edge. A seamless veneer may thereby be formed and fixed to the steel facing sheet and associated molding as a single piece to finish the panel in a manner simulating the appearance of a solid slab.

6 Claims, 2 Drawing Sheets

DECORATIVE PANEL CONSTRUCTION

FIELD OF THE INVENTION

The present invention relates generally to the construction of decorative panels and more particularly to panels which are not only lightweight, but are also sturdy and resist warping such that they can be advantageously used for decorative partitions, counter tops, tables, desk tops and other like furniture.

DESCRIPTION OF THE PRIOR ART

There are many uses for sturdy, flat panels in the construction of furniture of various types. For example, in the construction of desks for use in an office, the desk typically has a relatively thick, flat top defining a work surface. Desk tops have been made in a variety of ways. In an early form of a desk top, wood planks are simply glued together lengthwise and prepared with an appropriate finish and edge treatment to form a unitary decorative slab. However, a known disadvantage of such a slab construction is that ambient temperature and humidity conditions can readily cause unequal stress forces in the slab thereby causing it to warp. Even a small amount of warpage is undesirable, particularly for furniture construction. Such slabs are also very heavy and add considerable weight to the associated furniture.

In order to overcome the problem of warping, it is known to construct furniture tops as a composite structure having a warp resistant core which is overlaid with a veneer or decorative laminate. Such a construction is disclosed, for example, in Richardson, U.S. Pat. No. 1,875,888. Particularly, with the advent of particle board used as a core component, composite furniture tops have been constructed which are sturdy and which also resist warping. However, such tops are not only very heavy, they require an edge treatment of some kind in order to achieve an acceptable finished appearance. Such edge treatments may involve wood banding or other decorative strip means applied to conceal the edges of the particle board. These treatments necessarily add cost to the top construction.

In recent times, it has been known to construct composite slabs or panels comprising a fiber honeycomb core glued between two facing skins made of thin steel sheets. Such a panel construction is disclosed, for example, in Martin, U.S. Pat. No. 5,197,256. As disclosed by Martin, the fiber core may be associated with a frame which surrounds the fiber core thereby concealing the edges of the core. With the use of a suitable honeycomb core, such a slab construction is not only very sturdy, it is considerably lightweight and resistant to warping. Accordingly, this construction lends itself to the manufacture of slabs suitable for use in decorative partitions or the like. To this end, these panels may have decorative facing sheets fixed as by gluing to the steel skins and separate decorative trim strips may be glued to the edges of the frame. While such a panel may be suitable for use as a decorative partition member, in a furniture top, it is often desirable to provide the top with a decorative contoured molded edge. Honeycomb desk tops are known, for example, wherein the edges of the top are fitted with a metal trim molding. An example of such a desk top is embodied in a line of desk products sold in the early 1960's by the assignee of the present invention under the name "VS" desk line. These desks had composite tops constructed of a honeycomb core glued between two thin sheets of steel and overlaid with linoleum. To conceal the edge of the core, an aluminum molding was fastened to the edge and had a vinyl insert bumper strip. While these desks were sturdy and rugged, because of the aluminum edging of the top, they did not present the aesthetically pleasing appearance of having a unitary slab-like desk top construction. Accordingly, it is desirable to provide an edge system for a honeycomb core panel wherein at least one face of the panel and the panel edges are covered with a unitary, seamless veneer or decorative laminate to thereby simulate the appearance of a solid one-piece slab.

SUMMARY OF THE INVENTION

The present invention improves over the prior art by providing a panel or slab construction including a fiber core glued between two facing sheets of thin metal and having edges of the core spaced inwardly of the slab from the associated edges of the metal facing sheets thereby defining a recess. A decorative molding member having a predetermined shaped edge has a portion which extends into the recess and is fixed to the edges of the metal sheets thereby concealing the adjacent edges of the core. At least one side of the molding is stepped approximately the thickness of the metal sheet such that the sheet overlies the molding with its exposed surface forming a flush transition with the surface of the shaped molding edge. A seamless veneer may thereby be formed and fixed to the steel facing sheet and associated molding as a single piece to finish the panel in a manner simulating the appearance of a solid slab.

BRIEF DESCRIPTION OF THE DRAWINGS

The foregoing and other novel features and advantages of the invention will be better understood by a reading of the following detailed description taken in conjunction with the accompanying drawings wherein.

DETAILED DESCRIPTION OF THE PREFERRED EMBODIMENT

Figure 1:
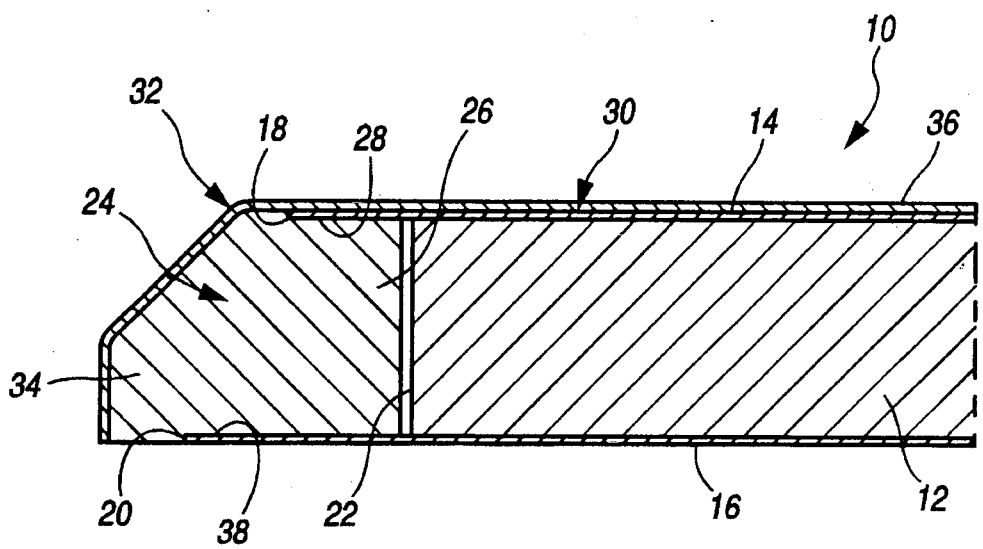
FIG. 1 is a cross-sectional view of an edge of a panel constructed in accordance with the invention.

Referring now to the drawings, and initially to FIG. 1, a panel constructed in accordance with the principles of the invention is designated generally by the reference numeral 10. The panel 10 preferably comprises a fiber core 12 which in one form may have a honeycomb configuration. The core 12 is disposed between an upper skin 14 and a lower skin 16. The skins are secured to the core 12 as by gluing, in a manner well known in the art. In a preferred form, both skins 14 and 16 are made of sheet steel. The combination of the honeycomb core 12 and opposed steel skins 14 and 16 creates a panel 10 which is not only lightweight but is extremely sturdy and rigid for its weight and is also highly resistant to warping.

As seen in FIG. 1, marginal portions 18 and 20 of the skins 14 and 16, respectively, extend beyond edge 22 of the fiber core 12 and define a recess within which one elongated decorative edge molding 24 is received. The molding 24 has a proximal portion 26 having a stepped recess 28 formed along its upper surface. The recess 28 is dimensioned so as to closely approximate the thickness of the steel skin 14 such that the skin 14 may be glued to the molding portion 24 without a discontinuity between the outer surface 30 of the skin 14 and the outer exposed surface 32 of the molding 24.

In accordance with the invention, the molding 24 has a contoured distal portion 34 extending outwardly from the marginal portions 18 and 20 of the skins 14 and 16; this distal portion 34 is formed with a suitable contoured decorative shape. Overlying the exposed, contoured molding portion 34 and the entire upper surface of the skin 14 is a finished layer or sheet 36 which may be a natural wood veneer or a pressure-formed plastic decorative laminate, for example. A stepped recess 38 may also be formed in the lower surface of molding portion 24 to receive the extending marginal portion 20 of the lower skin 16 and thereby provide a flush, continuous transition between the outer surface of the skin 16 and molding 24.

It can now be appreciated that a panel 10 constructed in accordance with the invention provides a highly desirable structure for use as a furniture top or other decorative panel. As mentioned above, the panel 10 is considerably sturdy yet lightweight. Moreover, the configuration of the molding stepped recess 28 which allows for a smooth transition between the skin 14 and molding 24 makes it possible to overlay the skin 14 and molding 24 with a seamless veneer or decorative laminate 36 such that no seam between the skin 14 and molding 24 is at all discernable. This gives the highly desirable appearance of a panel construction which is formed from a solid slab of material without revealing any internal component members of the panel 10. It can further be appreciated that the panel 10 can be manufactured with considerable economics over prior art constructions.

Figure 2:
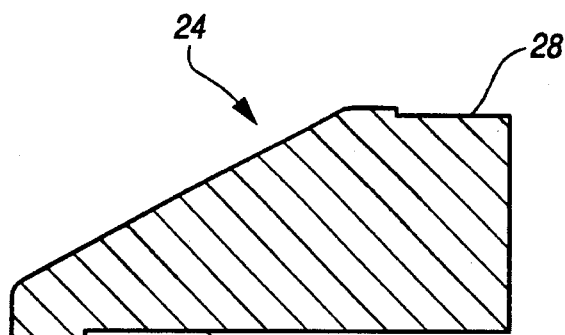
FIG. 2 is a cross-sectional view of an alternative edge molding for use in the panel construction of FIG. 1.
Figure 3:
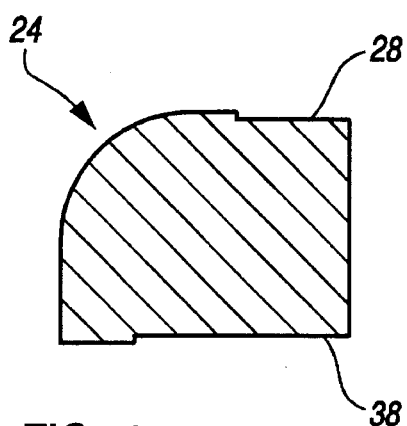
FIG. 3 is a cross-sectional view of another alternative edge molding.
Figure 4:
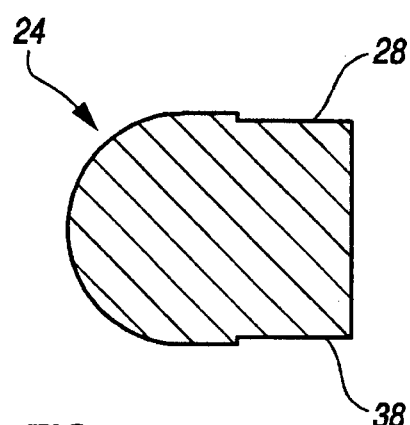
FIG. 4 is a cross-sectional view of another alterative edge molding.

FIGS. 2, 3, and 4 illustrate, by way of examples, alternative shapes for edge moldings 24 which are readily adaptable for use in the panel 10. These shapes are such that a suitable veneer or laminate may readily be formed over the distal portion 34 of the molding member 24 and the skins 14 and 16 to lend a variety of aesthetically pleasing panel edge appearances. In a preferred form of the panel 10, constructed for use as an office desk top, a honeycomb core 12 having a thickness of approximately one inch is acceptable. Steel skins 14 and 16 on the order of 0,028 inches in thickness have also been found acceptable from the standpoint of strength characteristics. The molding 24 may be readily formed from 45 lb. density particle board, for example.

Figure 5:
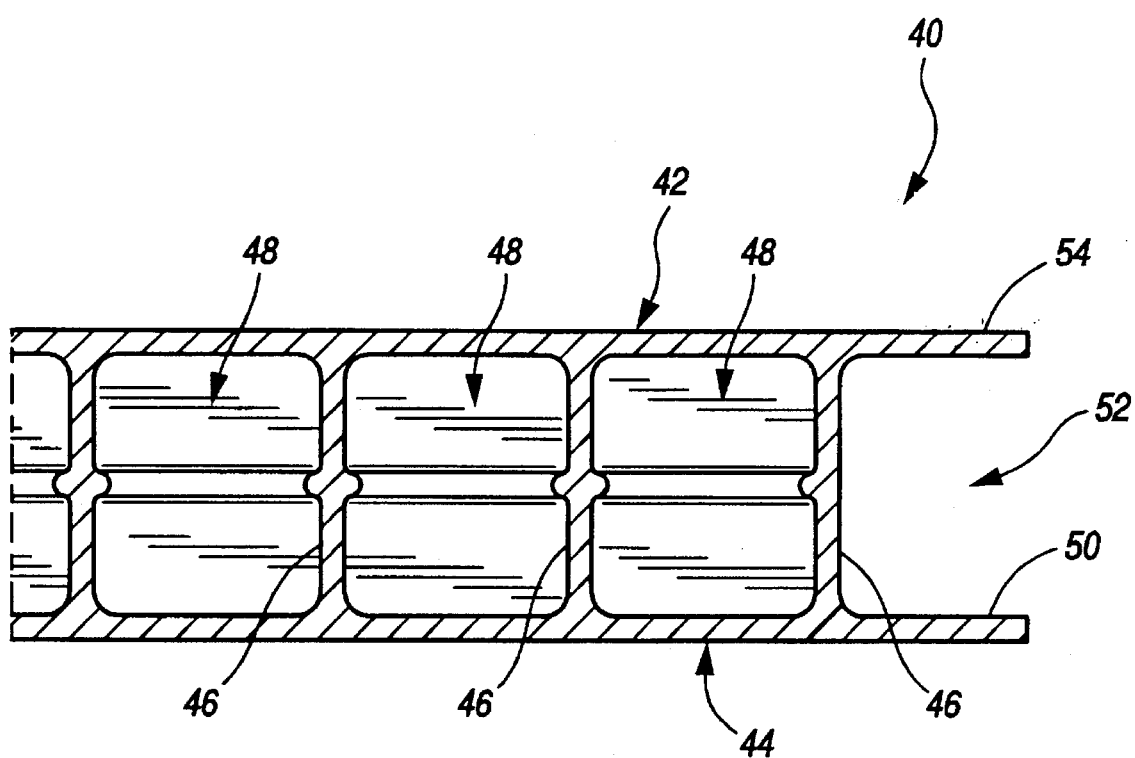
FIG. 5 is a cross-sectional view of an alternative core structure for a panel constructed in accordance with the invention.

An alternative construction for a panel 10 in accordance with the invention may be appreciated with reference to FIG. 5. FIG. 5 illustrates a rigid, lightweight fiber core 40 of a type sold under the name "Gridcore Spaceboard." This core 40 is an integrally formed member having two opposed, flat smooth surface portions 42 and 44 connected by a series of internal ribs 46 which define hollow cells 48. The resulting core structure 40 is extremely strong for its weight and is highly resistant to impact forces applied to its surfaces 42 and 44. For this reason, the core 40 is very suitable for forming a panel 10 wherein the core 40 is formed with extending marginal portions 54 and 50 which define a recess 52. As in the panel 10 of FIG. 1, a molding 24 having a proximal portion 26 with a stepped recess 28 formed along its upper surface may be inserted and glued into the recess 52 of the core 40. In such case, the stepped recess 28 is dimensioned so as to closely approximate the thickness of the core marginal portion 54 and thereby form a smooth continuous transition between the core surface 42 and the upper surface of the molding 24. Thereby, a veneer or decorative laminate sheet 36 may be formed directly over the entire upper surface 42 of the core 40 and molding 24 such that no joint between the core 40 and molding 24 is discernable. In this construction, of course, there is no need to provide separate metal skins 14 and 16 to form rigid surfaces for the core.

While the present invention has been described in connection with preferred embodiments thereof, it will be apparent to those skilled in the art that many changes and modifications may be made without departing from the true spirit and scope of the invention. Accordingly, it is intended by the appended claims to cover all such changes and modifications as come within the true spirit and scope of the invention.

What is claimed is:

1. A composite panel assembly comprising:
   (a) a lightweight structural core with opposed face surface members and a peripheral edge surface;
   (b) at least one of said face surface members having a marginal portion extending beyond said peripheral edge surface of said core thereby defining a recess along said edge surface;
   (c) an elongated molding member having a contoured distal portion with an outer surface, said molding member also including a proximal portion, the proximal portion being received in said recess;
   (d) said molding member having a stepped recess in its proximal portion, said stepped recess being dimensioned and configured to receive the marginal portion of said one face surface member and provide a smooth transition between the outer surface of said one face surface member and the outer surface of said contoured distal portion; and
   (e) a decorative sheet surface member fixed to the outer surface of said one face surface member and to the outer surface of said contoured distal portion of said molding member, said sheet surface member providing a seamless covering for said one face surface member and said molding member thereby to simulate an edge appearance of a solid unitary panel member.

2. The panel assembly of claim 1 wherein said core includes a fiber structure.

3. The panel assembly of claim 2 wherein said fiber structure has a honeycomb configuration.

4. The panel assembly of claim 1 further defined by:
   (a) the other of said face surface members having a marginal portion extending beyond said one edge surface of said core, said other of said face surface members having an outer surface; and
   (b) said molding member having a second stepped recess in its proximal portion, said second stepped recess being dimensioned to receive the marginal portion of the other of said face surface members thereby providing a smooth transition between the outer surface of said other face surface member and the outer surface of said contoured distal portion of said molding member.

5. The panel assembly of claim 1 wherein said face surface members are formed from sheet steel.

6. The panel assembly of claim 1 wherein said face surface members are formed as part of a unitary structure having integrally formed ribs connecting said face surface members.

* * * * *